United States Patent
Li et al.

(10) Patent No.: US 10,560,337 B2
(45) Date of Patent: Feb. 11, 2020

(54) METHOD, APPARATUS, AND SYSTEM FOR IMPLEMENTING SOFTWARE-DEFINED NETWORK SDN

(71) Applicant: Huawei Technologies Co., Ltd., Shenzhen (CN)

(72) Inventors: Hua Li, Nanjing (CN); Xiaoyi Zhang, Nanjing (CN); Wenhui Li, Nanjing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 15/449,618

(22) Filed: Mar. 3, 2017

(65) Prior Publication Data
US 2017/0180213 A1 Jun. 22, 2017

Related U.S. Application Data

(63) Continuation of application No. PCT/CN2015/088273, filed on Aug. 27, 2015.

(30) Foreign Application Priority Data

Sep. 5, 2014 (CN) .......................... 2014 1 0459244

(51) Int. Cl.
*H04L 1/12* (2006.01)
*H04L 12/24* (2006.01)
(Continued)

(52) U.S. Cl.
CPC .......... *H04L 41/12* (2013.01); *G06F 9/45533* (2013.01); *H04L 41/08* (2013.01);
(Continued)

(58) Field of Classification Search
CPC ..... G06F 15/173; H04L 12/24; H04L 12/713; H04L 12/741; H04L 12/911;
(Continued)

(56) References Cited

U.S. PATENT DOCUMENTS 8,774,054 B2 7/2014 Yin et al.
9,755,986 B1* 9/2017 Brown .................... H04L 69/00
(Continued)

FOREIGN PATENT DOCUMENTS

CN 103441935 A 12/2013
CN 103825954 A 5/2014
(Continued)

OTHER PUBLICATIONS

Masayoshi Kobayashi et al., "Maturing of OpenFlow and Software-defined Networking through Deployments", Computer Networks, vol. 61, 2014, pp. 151-175.
(Continued)

*Primary Examiner* — Jamaal Henson
(74) *Attorney, Agent, or Firm* — Slater Matsil, LLP

(57) ABSTRACT

A method for implementing a software-defined network (SDN) includes receiving, by an SDN controller, virtual network information sent by a cloud computing platform, where the virtual network information includes a correspondence between information about a virtual machine (VM) and information about a server running the VM. The method also includes acquiring, by the SDN controller, physical network information, where the physical network information includes a correspondence between information about a top-of-rack (TOR) switch and the information about the server. Additionally, the method includes acquiring, by the SDN controller, a correspondence between the information about the VM and the information about the TOR switch according to the virtual network information and the physical network information.

18 Claims, 5 Drawing Sheets

(51) Int. Cl.
  *G06F 9/455* (2018.01)
  *H04L 12/931* (2013.01)
  *H04L 29/12* (2006.01)
  *H04L 29/08* (2006.01)

(52) U.S. Cl.
  CPC .............. *H04L 41/20* (2013.01); *H04L 49/70* (2013.01); *H04L 61/2007* (2013.01); *H04L 69/324* (2013.01); *H04L 61/6022* (2013.01)

(58) Field of Classification Search
  CPC ....... H04L 12/931; H04L 29/08; H04L 29/12; H04L 45/745; H04L 47/20; H04L 47/70
  See application file for complete search history.

(56) References Cited

U.S. PATENT DOCUMENTS

| | | |
|---|---|---|
| 2010/0214949 A1 | 8/2010 | Smith et al. |
| 2011/0299537 A1 | 12/2011 | Saraiya et al. |
| 2013/0125124 A1 | 5/2013 | Kempf et al. |
| 2013/0322443 A1* | 12/2013 | Dunbar ................. H04L 12/185 370/390 |
| 2014/0025816 A1 | 1/2014 | Otani |
| 2014/0064066 A1* | 3/2014 | Lumezanu ............. H04L 47/12 370/229 |
| 2014/0115175 A1* | 4/2014 | Lublin .................. G06F 9/4856 709/228 |
| 2014/0229944 A1* | 8/2014 | Wang .................... G06F 9/5088 718/1 |
| 2015/0124814 A1* | 5/2015 | De Silva ............... H04L 45/745 370/392 |
| 2015/0358231 A1* | 12/2015 | Zhang ..................... H04L 45/38 370/392 |
| 2016/0156702 A1* | 6/2016 | Morper ................... H04L 67/10 709/223 |
| 2016/0277251 A1 | 9/2016 | Dempo |

FOREIGN PATENT DOCUMENTS

| | | |
|---|---|---|
| EP | 2924925 | 9/2015 |
| WO | 2012109868 A1 | 8/2012 |
| WO | 2014080993 | 5/2014 |

OTHER PUBLICATIONS

Jian Li et al., "EmuCloud: An Extension to Build SDN Test Environment on IAAS Cloud", 2014 9th International Conference on Communications and Networking in China (Chinacom), IEEE, pp. 490-493.
IEEE, "Media Access Control (MAC) Bridges and Virtual Bridged Local Area Networks", IEEE Std 802.1Q, 2012 Edition, 1782 pages.
IEEE, "MAC Bridges and Virtual Bridged Local Area Networks—Amendment XX: Edge Virtual Bridging", IEEE P802.1Qbg/D2.2, Feb. 18, 2012, 187 pages.
IEEE, "Station and Media Access Control Connectivity Discovery", IEEE P802.1AB-REV/D6.0, Jun. 8, 2009, 202 pages.

* cited by examiner

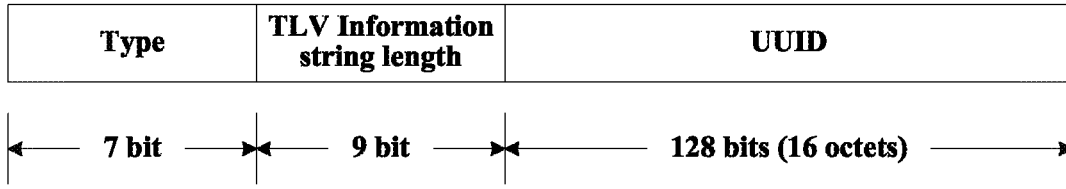

FIG. 3

A.4 Asynchronous Messages
A.4.1 Packet-In Message
When packets are received by the datapath and sent to the controller, they use the OFPT_PACKET_IN message:

```
/* Packet received on port (datapath -> controller). */
struct ofp_packet_in {
    struct ofp_header header;
    uint32_t buffer_id;    /* ID assigned by datapath. */
    uint16_t total_len;    /* Full length of frame. */
    uint8_t reason;        /* Reason packet is being sent (one of OFPR_*) */
    uint8_t table_id;      /* ID of the table that was looked up */
    uint64_t cookie;       /* Cookie of the flow entry that was looked up. */
    struct ofp_match match; /* Packet metadata. Variable size. */
    /* Followed by:
     *   - Exactly 2 all-zero padding bytes, then
     *   - An Ethernet frame whose length is inferred from header.length.
     * The padding bytes preceding the Ethernet frame ensure that the IP
     * header (if any) following the Ethernet header is 32-bit aligned.
     */
    //uint8_t pad[2];        /* Align to 64 bit + 16 bit */
    //uint8_t data[0];       /* Ethernet frame */
};
OFP_ASSERT(sizeof(struct ofp_packet_in) == 32);
```

FIG. 4

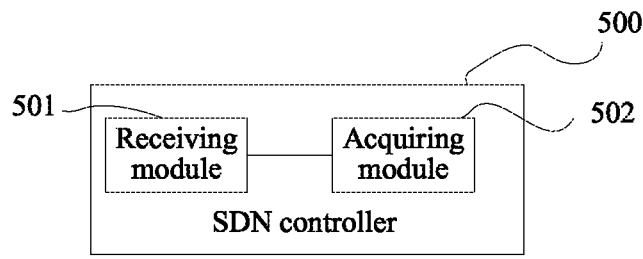

FIG. 5

METHOD, APPARATUS, AND SYSTEM FOR IMPLEMENTING SOFTWARE-DEFINED NETWORK SDN

CROSS-REFERENCE TO RELATED APPLICATIONS

This application is a continuation of International Application No. PCT/CN2015/088273, filed on Aug. 27, 2015, which claims priority to Chinese Patent Application No. 201410459244.6, filed on Sep. 5, 2014. The disclosures of the aforementioned applications are hereby incorporated by reference in their entireties.

TECHNICAL FIELD

The application relates to the field of network technologies, and in particular, to a method, an apparatus, and a system for implementing a software-defined network (SDN).

BACKGROUND

A cloud computing platform OpenStack is an open-source infrastructure as a service (IaaS) cloud computing platform, which may allow anyone to establish and provide a cloud computing service. The OpenStack includes multiple relatively independent serving components, for example, including: Compute (Nova), which is virtual machine management component, used for virtual machine computation or used to start a virtual machine instance by using a group, where Compute is an OpenStack computing node and is also referred to as a Nova component; Networking (Neutron), which is a network management component and provides a virtual network function in a cloud computing environment. The Openstack may send management and control information of a virtual network to a software defined network (SDN) controller by using a Neutron application program interface (API), so as to implement virtual network slicing, and complete automatic orchestration of a physical network with virtual computation and storage.

The management and control information of the virtual network sent by the Openstack to the SDN controller includes information such as a virtual tenant network, a subnetwork, and an accessed virtual machine, and does not include physical network information of the virtual machine. The SDN controller does not know specific information about a top-of-rack (TOR) switch of the virtual machine. Therefore, a physical forwarding path cannot be established on a physical network for the virtual machine, and it is difficult to support self-service provisioning and on-demand adjustment.

In the prior art, maintenance personnel manually configure, on the SDN controller, information about a server to which a physical port on the TOR switch is connected, or manually configures a binding relationship between the physical port on the TOR switch and the virtual network. However, because there are huge quantities of virtual machines and servers on an SDN network, the method in the prior art in which configuration is manually performed by the maintenance personnel involves a heavy workload, and cannot desirably support self-service provisioning and on-demand adjustment.

SUMMARY

To better support self-service provisioning and on-demand adjustment, embodiments of the application provide a method, an apparatus, and a system for implementing a software-defined network (SDN).

According to a first aspect, a method for implementing a SDN is provided, including receiving, by an SDN controller, virtual network information sent by a cloud computing platform, where the virtual network information includes a correspondence between information about a virtual machine (VM) and information about a server running the VM. The method also includes acquiring, by the SDN controller, physical network information, where the physical network information includes a correspondence between information about a top-of-rack (TOR) switch connected to the server and the information about the server. Additionally, the method includes acquiring, by the SDN controller, a correspondence between the information about the VM and the information about the TOR switch according to the virtual network information and the physical network information.

With reference to the first aspect, in a first possible implementation manner, the information about the VM includes a VM media access control (MAC) address or a VM internet protocol (IP) address; the information about the server includes at least one of the following elements: a network interface card address of the server, a system name SystemName of the server, a universally unique identifier (UUID) of the server, and an identifier of a virtual switch vSwitch on the server; and the information about the TOR switch includes an equipment identity of the TOR switch, and information about a physical port connected to the server.

With reference to the first aspect or the first possible implementation manner of the first aspect, in a second possible implementation manner, the acquiring, by the SDN controller, physical network information includes: receiving, by the SDN controller, an OpenFlow protocol standard Packet-In message sent by the TOR switch, where the Packet-In message is formed by encapsulating a received Link Layer Discovery Protocol (LLDP) packet that is sent by the server and to which the TOR switch has added the information about the TOR switch, the LLDP packet carries the information about the server, and the SDN controller parses the Packet-In message to obtain the physical network information; or receiving, by the SDN controller, the physical network information sent by the TOR switch, where the TOR switch parses a received LLDP packet sent by the server to obtain the information about the server, and the TOR switch sends the physical network information to the SDN controller.

With reference to the second possible implementation manner of the first aspect, in a third possible implementation manner, the network interface card MAC address of the server is carried by using an LLDP packet of Basic management type-length-value (TLV) Type 2, the SystemName of the server is carried by using an LLDP packet of Basic management TLV Type 5, or the UUID of the server is carried by adding an LLDP packet of a new Basic management TLV Type.

With reference to any one of the first aspect or the first to third possible implementation manners of the first aspect, in a fourth possible implementation manner, the receiving, by an SDN controller, virtual network information sent by a cloud computing platform includes: receiving, by the SDN controller, a virtual network configuration table sent by the cloud computing platform, where the virtual network configuration table carries the virtual network information, and a tunnel_endpoints table in the virtual network configuration table carries the information about the server.

With reference to the first aspect or any one of the first to fourth possible implementation manners of the first aspect, in a fifth possible implementation manner, the virtual network information is carried in a response message that is replied by the server to a Nova component of the cloud computing platform after the Nova component sends a GET acquisition request message to the server.

According to a second aspect, a SDN controller is provided, including a receiving module, configured to receive virtual network information sent by a cloud computing platform, where the virtual network information includes a correspondence between information about a virtual machine VM and information about a server running the VM. The SDN controller also includes an acquiring module, configured to acquire physical network information, where the physical network information includes a correspondence between information about a TOR switch connected to the server and the information about the server, where the acquiring module is further configured to acquire a correspondence between the information about the VM and the information about the TOR switch according to the virtual network information and the physical network information.

With reference to the second aspect, in a first possible implementation manner, the information about the VM includes a VM MAC address or a VM IP address; the information about the server includes at least one of the following elements: a network interface card address of the server, a system name SystemName of the server, a universally unique identifier UUID of the server, and an identifier of a virtual switch vSwitch on the server; and the information about the TOR switch includes an equipment identity of the TOR switch, and information about a physical port connected to the server.

According to a third aspect, a TOR switch is provided, including: a receiving module, configured to receive an LLDP packet sent by a server, where the LLDP packet carries information about the server; and a processing module, configured to: encapsulate the LLDP packet as an OpenFlow protocol standard Packet-In message through adding information about the TOR switch to the LLDP packet that carries information about the server, and send the Packet-In message to a SDN controller; or configured to: parse the received LLDP packet sent by the server to obtain the information about the server, and send a correspondence between information about the TOR switch and the information about the server to an SDN controller.

With reference to the third aspect, in a first possible implementation manner, the receiving module is configured to receive an LLDP packet of Basic management TLV Type 2, an LLDP packet of Basic management TLV Type 5, or an LLDP packet of a new Basic management TLV Type, where the LLDP packet of Basic management TLV Type 2 carries a network interface card MAC address of the server, the LLDP packet of Basic management TLV Type 5 carries a system name SystemName of the server, and the LLDP packet of the new Basic management TLV Type carries a UUID of the server.

According to a fourth aspect, a cloud computing platform is provided, including: a Nova component, configured to receive virtual network information sent by a server running a VM, where the virtual network information includes a correspondence between information about the VM and information about the server; and a Neutron component, configured to send the virtual network information to a SDN controller.

Optionally, the Neutron component is configured to send a virtual network configuration table to the SDN controller, where the virtual network configuration table carries the virtual network information, and a tunnel_endpoints table in the virtual network configuration table carries the information about the server.

According to fifth aspect, a server is provided, including: a first sending module, configured to send virtual network information to a cloud computing platform, where the virtual network information includes a correspondence between information about a VM running on the server and information about the server; and a second sending module, configured to send an LLDP packet to a TOR switch, where the LLDP packet carries the information about the server.

With reference to the fifth aspect, in a first possible implementation manner, the second sending module is configured to send an LLDP packet of Basic management TLV Type 2, an LLDP packet of Basic management TLV Type 5, or an LLDP packet of a new Basic management TLV Type, where the LLDP packet of Basic management TLV Type 2 carries a network interface card MAC address of the server, the LLDP packet of Basic management TLV Type 5 carries a system name SystemName of the server, and the LLDP packet of the new Basic management TLV Type carries a UUID of the server.

According to a sixth aspect, a software-defined network SDN is provided, including: the SDN controller, the TOR switch, the cloud computing platform, and the server that are described above.

According to the method, the apparatus, and the system for implementing an SDN provided in the embodiments of the application, an SDN controller receives virtual network information sent by a cloud computing platform, where the virtual network information is sent by a server running a VM to the cloud computing platform, and the virtual network information includes a correspondence between information about the VM and information about the server; the SDN controller acquires physical network information, where the physical network information includes a correspondence between information about a TOR switch connected to the server and the information about the server; and the SDN controller acquires a correspondence between the information about the VM and the information about the TOR switch according to the virtual network information and the physical network information, so as to establish a physical forwarding path on a physical network for the virtual machine, implement mapping from a virtual network to the physical network, and better support, on the cloud computing platform, self-service provisioning and on-demand adjustment of the SDN controller.

BRIEF DESCRIPTION OF THE DRAWINGS

FIG. 3 is a schematic diagram of a Link Layer Discovery Protocol (LLDP) packet carrying a universally unique identifier (UUID) type-length-value (TLV) of a server according to an embodiment of the application;

FIG. 4 is a schematic diagram of a format of a Packet_In message according to an embodiment of the application;

FIG. 5 is a schematic structural diagram of a software-defined network (SDN) controller according to an embodiment of the application;

DETAILED DESCRIPTION OF ILLUSTRATIVE EMBODIMENTS

To make the objectives, technical solutions, and advantages of the embodiments of the application clearer, the following clearly describes the technical solutions in the embodiments of the application with reference to the accompanying drawings in the embodiments of the application. Apparently, the described embodiments are some but not all of the embodiments of the application. All other embodiments obtained by a person of ordinary skill in the art based on the embodiments of the application without creative efforts shall fall within the protection scope of the application.

The following further describes the embodiments of the application in detail with reference to accompanying drawings in this specification.

Figure 1:
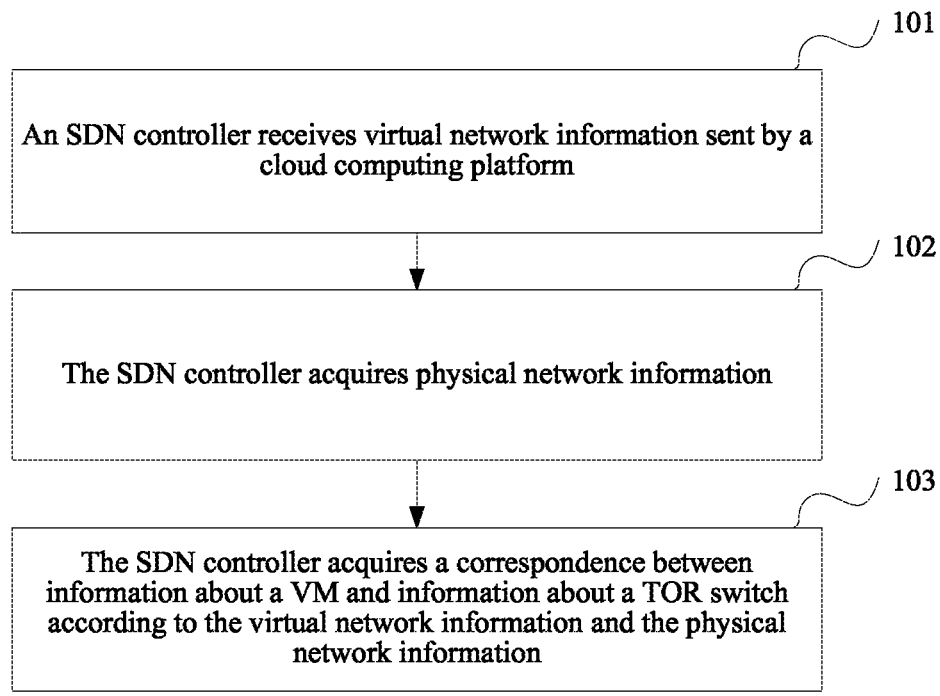
FIG. 1 is a flowchart of a method for implementing a software-defined network (SDN) according to an embodiment of the application.

As shown in FIG. 1, an embodiment of the application provides a method for implementing a software-defined network (SDN), including.

S101: An SDN controller receives virtual network information sent by a cloud computing platform, where the virtual network information includes a correspondence between information about a virtual machine (VM) and information about a server running the VM.

S102: The SDN controller acquires physical network information, where the physical network information includes a correspondence between information about a top-of-rack (TOR) switch connected to the server and the information about the server.

S103: The SDN controller acquires a correspondence between the information about the VM and the information about the TOR switch according to the virtual network information and the physical network information.

According to a method for implementing an SDN provided in this embodiment of the application, a physical forwarding path may be established on a physical network for a virtual machine, so as to implement mapping from a virtual network to the physical network, and better support, on a cloud computing platform, self-service provisioning and on-demand adjustment of an SDN controller.

Optionally, the information about the VM includes a VM media access control (MAC) address or a VM internet protocol (IP) address; the information about the server includes at least one of the following elements: a network interface card address of the server, a system name SystemName of the server, a universally unique identifier (UUID) of the server, and an identifier of a virtual switch vSwitch on the server; and the information about the TOR switch includes an equipment identity of the TOR switch, and information about a physical port connected to the server.

Optionally, that the SDN controller acquires physical network information includes: receiving, by the SDN controller, an OpenFlow protocol standard Packet-In message sent by the TOR switch, where the Packet-In message is formed by encapsulating a received Link Layer Discovery Protocol (LLDP) packet that is sent by the server and to which the TOR switch has added the information about the TOR switch, the LLDP packet carries the information about the server, and the SDN controller parses the Packet-In message to obtain the physical network information; or receiving, by the SDN controller, the physical network information sent by the TOR switch, where the TOR switch parses a received LLDP packet sent by the server to obtain the information about the server, and the TOR switch sends the physical network information to the SDN controller.

This solution of the application is easy to implement. In addition, protocol load is small when an LLDP is run on the server. Therefore, server performance is barely affected.

Optionally, the network interface card MAC address of the server is carried by using an LLDP packet of Basic management TLV Type 2, the system name SystemName of the server is carried by using an LLDP packet of Basic management TLV Type 5, or the universally unique identifier UUID of the server is carried by adding an LLDP packet of a new Basic management TLV Type.

Optionally, that an SDN controller receives virtual network information sent by a cloud computing platform includes: receiving, by the SDN controller, a virtual network configuration table sent by the cloud computing platform, where the virtual network configuration table carries the virtual network information, and a tunnel_endpoints table in the virtual network configuration table carries the information about the server.

Optionally, the virtual network information is carried in a response message that is replied by the server to a Nova component of the cloud computing platform after the Nova component sends a GET acquisition request message to the server; a Neutron component of the cloud computing platform acquires the virtual network information from the Nova component by using a Restful interface; and the Neutron component of the cloud computing platform sends the virtual network information to the SDN controller by using a southbound interface of the cloud computing platform.

Figure 2:
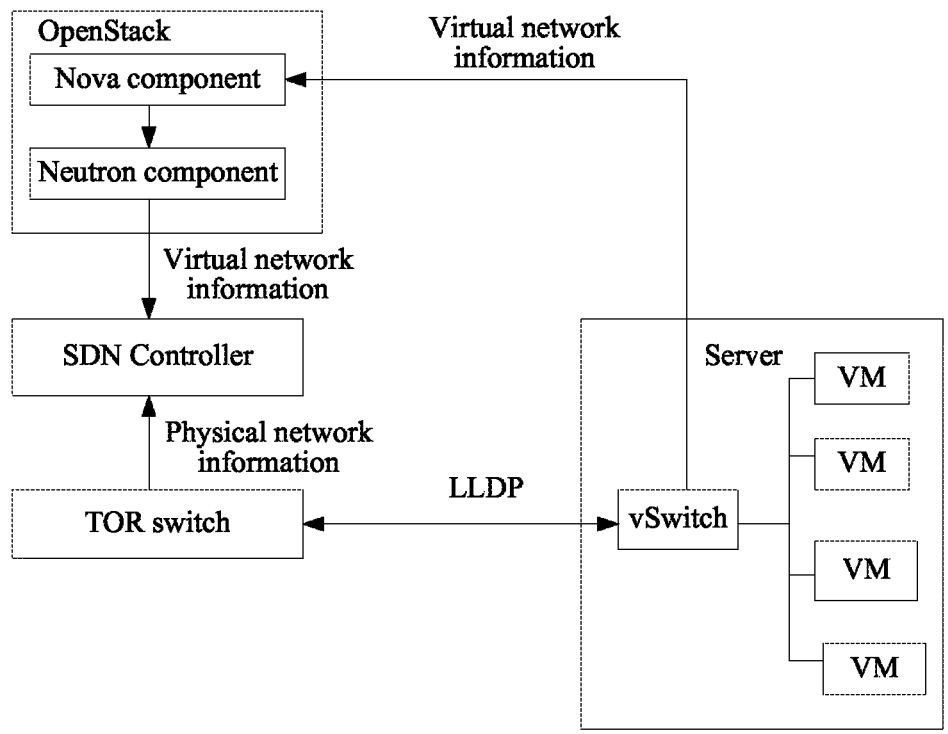
FIG. 2 is a schematic diagram of a method for implementing a software-defined network SDN according to an embodiment of the application.

A method for implementing a software-defined network SDN provided in another embodiment of the application is described below with reference to FIG. 2:

1. An SDN controller receives virtual network information sent by a cloud computing platform, where the virtual network information includes a correspondence between information about a virtual machine VM and information about a server running the VM.

Herein.

The information about the VM includes a VM MAC address or a VM IP address; or the information about the VM may include: an ID of a virtual local area network VLAN on which the VM is located, a subnetwork, gateway information, and the like, which are not limited in this embodiment of the application, and all belong to the protection scope of this embodiment of the application.

The information about the server includes at least one of the following elements: a network interface card address of the server, a system name (SystemName) of the server, a UUID of the server, and an identifier of a virtual switch (vSwitch) on the server. The UUID is a software build standard, with an objective of enabling all elements in a distributed system to have unique identification information. The UUID is a 128-bit numeric value, and each server may generate a respective UUID.

The information about the VM is generated and stored when a Nova component of the cloud computing platform OpenStack creates the virtual machine, the information about the server corresponding to the information about the VM is carried in a response message replied by the server to the Nova component after the Nova component sends a GET acquisition request message to the server; and a Neutron component of the OpenStack acquires the virtual network information from the Nova component by using a Restful interface.

The Neutron component of the OpenStack sends the virtual network information to the SDN controller by using a southbound interface of the OpenStack.

The Neutron component of the OpenStack sends a virtual network configuration table to the SDN controller, where the virtual network configuration table carries the virtual network information. As shown in the following table, the virtual network configuration table may include: a network table, a subnet table, a port table, a port_binding table, an IP allocation table, a network_binding table, and a tunnel_endpoints table, where a correspondence between the VM and the server is carried by using the port_binding table. For example, an identifier of the VM is carried by using port_id. An identifier of the server is carried by using a host field. Detailed information about the VM is carried by using the port table. For example, the MAC address of the VM is carried by using mac_address. Detailed information about the server is carried by using the tunnel_endpoints table. For example, the network interface card address (which is generally a network interface card MAC address) of the server, the SystemName, or the UUID is carried by using a newly added host field in the tunnel_endpoints table.

Virtual network configuration table:

(1) Network table

```
mysql> desc networks;
+--------------+--------------+------+-----+---------+-------+
| Field        | Type         | Null | Key | Default | Extra |
+--------------+--------------+------+-----+---------+-------+
| tenant_id    | varchar(255) | YES  |     | NULL    |       |
| id           | varchar(36)  | NO   | PRI | NULL    |       |
| name         | varchar(255) | YES  |     | NULL    |       |
| status       | varchar(16)  | YES  |     | NULL    |       |
| admin_state_up | tinyint(1) | YES  |     | NULL    |       |
| shared       | tinyint(1)   | YES  |     | NULL    |       |
+--------------+--------------+------+-----+---------+-------+
```

(2) Subnet table

```
mysql> desc subnets;
+--------------+--------------+------+-----+---------+-------+
| Field        | Type         | Null | Key | Default | Extra |
+--------------+--------------+------+-----+---------+-------+
| tenant_id    | varchar(255) | YES  |     | NULL    |       |
| id           | varchar(36)  | NO   | PRI | NULL    |       |
| name         | varchar(255) | YES  |     | NULL    |       |
| network_id   | varchar(36)  | YES  | MUL | NULL    |       |
| ip_version   | int(11)      | NO   |     | NULL    |       |
| cidr         | varchar(64)  | NO   |     | NULL    |       |
| gateway_ip   | varchar(64)  | YES  |     | NULL    |       |
| enable_dhcp  | tinyint(1)   | YES  |     | NULL    |       |
| shared       | tinyint(1)   | YES  |     | NULL    |       |
+--------------+--------------+------+-----+---------+-------+
```

(3) Port table

```
mysql> desc ports;
+--------------+--------------+------+-----+---------+-------+
| Field        | Type         | Null | Key | Default | Extra |
+--------------+--------------+------+-----+---------+-------+
| tenant_id    | varchar(255) | YES  |     | NULL    |       |
| id           | varchar(36)  | NO   | PRI | NULL    |       |
| name         | varchar(255) | YES  |     | NULL    |       |
| network_id   | varchar(36)  | NO   | MUL | NULL    |       |
| mac_address  | varchar(32)  | NO   |     | NULL    |       |
| admin_state_up | tinyint(1) | NO   |     | NULL    |       |
| status       | varchar(16)  | NO   |     | NULL    |       |
| device_id    | varchar(255) | NO   |     | NULL    |       |
| device_owner | varchar(255) | NO   |     | NULL    |       |
+--------------+--------------+------+-----+---------+-------+
```

(4) Port_binding table

```
mysql> desc ml2_port_bindings;
+----------------+--------------+------+-----+---------+-------+
| Field          | Type         | Null | Key | Default | Extra |
+----------------+--------------+------+-----+---------+-------+
| port_id        | varchar(36)  | NO   | PRI | NULL    |       |
| host           | varchar(255) | NO   |     | NULL    |       |
| vif_type       | varchar(64)  | NO   |     | NULL    |       |
| cap_port_filter | tinyint(1)  | NO   |     | NULL    |       |
| driver         | varchar(64)  | YES  |     | NULL    |       |
| segment        | varchar(36)  | YES  | MUL | NULL    |       |
+----------------+--------------+------+-----+---------+-------+
```

(5) Ipallocation table

```
mysql> desc ipallocations;
+------------+-------------+------+-----+---------+-------+
| Field      | Type        | Null | Key | Default | Extra |
+------------+-------------+------+-----+---------+-------+
| port_id    | varchar(36) | YES  | MUL | NULL    |       |
| ip_address | varchar(64) | NO   | PRI | NULL    |       |
| subnet_id  | varchar(36) | NO   | PRI | NULL    |       |
| network_id | varchar(36) | NO   | PRI | NULL    |       |
+------------+-------------+------+-----+---------+-------+
```

(6) Network_binding table

```
mysql> desc ovs_network_bindings;
+------------------+-------------+------+-----+---------+-------+
| Field            | Type        | Null | Key | Default | Extra |
+------------------+-------------+------+-----+---------+-------+
| network_id       | varchar(36) | NO   | PRI | NULL    |       |
| network_type     | varchar(32) | NO   |     | NULL    |       |
| physical_network | varchar(64) | YES  |     | NULL    |       |
| segmentation_id  | int(11)     | YES  |     | NULL    |       |
+------------------+-------------+------+-----+---------+-------+
```

(7) Tunnel_endpoints table

```
mysql> desc tunnel_endpoints;
+------------+--------------+------+-----+---------+-------+
| Field      | Type         | Null | Key | Default | Extra |
+------------+--------------+------+-----+---------+-------+
| ip_address | varchar(64)  | NO   | PRI | NULL    |       |
| id         | int(11)      | NO   |     | NULL    |       |
| admin_ip   | varchar(64)  | NO   |     | NULL    |       |
| host       | varchar(255) | NO   |     | NULL    |       |
+------------+--------------+------+-----+---------+-------+
```

The SDN controller receives the virtual network information by using a northbound interface of the SDN controller.

2. The SDN controller acquires physical network information, where the physical network information includes a correspondence between information about a TOR switch connected to the server and the information about the server.

The TOR switch receives an LLDP packet sent by the server, where the LLDP packet carries the information about the server.

The network interface card MAC address of the server may be carried by using an LLDP packet of Basic management TLV Type 2, the SystemName of the server may be carried by using an LLDP packet of Basic management TLV Type 5, or the UUID of the server may be carried by adding an LLDP packet of a new Basic management TLV Type, where the Basic management TLV Type 5 is an Optional TLV, and this option needs to be enabled by an LLDP of the server; a packet format definition of a UUID TLV is shown in FIG. 3, and a Type value is to be allocated by the standard.

That the SDN controller acquires physical network information may include two methods.

In one method, the TOR switch encapsulates the LLDP packet as an OpenFlow protocol standard Packet-In message through adding information about the TOR switch to the LLDP packet that carries information about the server, where the information about the TOR switch includes an equipment identity of the TOR switch and information about a physical port connected to the server, and sends the Packet-In message to the SDN controller, where the SDN controller parses the Packet-In message to obtain the physical network information.

For a format of the Packet-In message, refer to the openflow-spec-v1.3.0. As shown in FIG. 4, a data field in the A.4.1 Packet—In Message includes the LLDP packet; and a match field in the A.4.1 Packet—In Message includes the information about the switch.

In another method, the SDN controller receives the physical network information sent by the TOR switch, where the TOR switch parses the received LLDP packet sent by the server to obtain the information about the server, and the TOR switch sends the physical network information to the SDN controller.

The TOR switch may send the physical network information to the SDN controller by using a Net config notification that is defined in rfc6470 and that carries the physical network information; or the TOR switch may send the physical network information to the SDN controller by using a conventional TRAP (simple network management protocol (SNMP) protocol) that carries the physical network information.

3. The SDN controller acquires a correspondence between the information about the VM and the information about the TOR switch according to the virtual network information and the physical network information.

In this way, a physical forwarding path may be established on a physical network for a virtual machine, so as to implement mapping from a virtual network to the physical network, and better support, on a cloud computing platform, self-service provisioning and on-demand adjustment of an SDN controller. In addition, this solution of the application is easy to implement. Protocol load is small when an LLDP is run on a server. Therefore, server performance is barely affected.

As shown in FIG. 5, an embodiment of the application further provides a software-defined network SDN controller 500, including: a receiving module 501, configured to receive virtual network information sent by a cloud computing platform, where the virtual network information includes a correspondence between information about a virtual machine VM and information about a server running the VM; and an acquiring module 502, configured to acquire physical network information, where the physical network information includes a correspondence between information about a top-of-rack TOR switch connected to the server and the information about the server, where the acquiring module is further configured to acquire a correspondence between the information about the VM and the information about the TOR switch according to the virtual network information and the physical network information.

Optionally, the information about the VM includes a VM MAC address or a VM IP address; the information about the server includes at least one of the following elements: a network interface card address of the server, a system name SystemName of the server, a UUID of the server, and an identifier of a virtual switch vSwitch on the server; and the information about the TOR switch includes an equipment identity of the TOR switch, and information about a physical port connected to the server.

Optionally, the acquiring module 502 is configured to: receive an OpenFlow protocol standard Packet-In message sent by the TOR switch, where the Packet-In message is formed by encapsulating a received LLDP packet that is sent by the server and to which the TOR switch has added the information about the TOR switch, the LLDP packet carries the information about the server, and the SDN controller parses the Packet-In message to obtain the physical network information; or receive the physical network information sent by the TOR switch, where the TOR switch parses a received LLDP packet sent by the server to obtain the information about the server, and the TOR switch sends the physical network information to the SDN controller.

Figure 6:
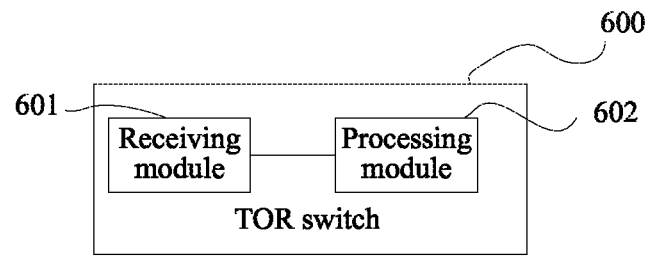
FIG. 6 is a schematic structural diagram of a top-of-rack (TOR) switch according to an embodiment of the application.

As shown in FIG. 6, an embodiment of the application further provides a top-of-rack TOR switch 600, including: a receiving module 601, configured to receive an LLDP packet sent by a server, where the LLDP packet carries information about the server; and a processing module 602, configured to: encapsulate the LLDP packet as an OpenFlow protocol standard Packet-In message through adding information about the TOR switch to the LLDP packet that carries information about the server, and send the Packet-In message to a software-defined network SDN controller; or configured to: parse the received LLDP packet sent by the server to obtain the information about the server, and send physical network information to the SDN controller, where the physical network information includes a correspondence between information about the TOR switch and the information about the server.

Optionally, the receiving module is configured to receive an LLDP packet of Basic management TLV Type 2, an LLDP packet of Basic management TLV Type 5, or an LLDP packet of a new Basic management TLV Type, where the LLDP packet of Basic management TLV Type 2 carries a network interface card MAC address of the server, the LLDP packet of Basic management TLV Type 5 carries a system name SystemName of the server, and the LLDP packet of the new Basic management TLV Type carries a universally unique identifier UUID of the server.

Figure 7:
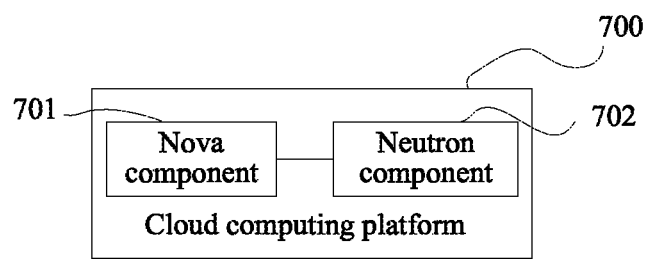
FIG. 7 is a schematic structural diagram of a cloud computing platform according to an embodiment of the application.

As shown in FIG. 7, an embodiment of the application further provides a cloud computing platform 700, including: a Nova component 701, configured to receive virtual network information sent by a server running a virtual machine VM, where the virtual network information includes a correspondence between information about the VM and information about the server; and a Neutron component 702, configured to send the virtual network information to a software-defined network SDN controller.

Optionally, the Neutron component is configured to send a virtual network configuration table to the SDN controller, where the virtual network configuration table carries the virtual network information, and a tunnel_endpoints table in the virtual network configuration table carries the information about the server.

Figure 8:
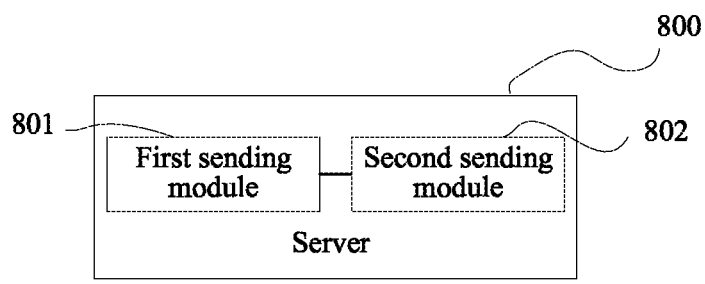
FIG. 8 is a schematic structural diagram of a server according to an embodiment of the application.

As shown in FIG. 8, an embodiment of the application further provides a server 800, including: a first sending module 801, configured to send virtual network information to a cloud computing platform, where the virtual network information includes a correspondence between information about a VM running on the server and information about the server; and a second sending module 802, configured to send an LLDP packet to a TOR switch, where the LLDP packet carries the information about the server.

Optionally, the second sending module 802 is configured to send an LLDP packet of Basic management TLV Type 2, an LLDP packet of Basic management TLV Type 5, or an LLDP packet of a new Basic management TLV Type, where the LLDP packet of Basic management TLV Type 2 carries a network interface card MAC address of the server, the LLDP packet of Basic management TLV Type 5 carries a system name SystemName of the server, and the LLDP packet of the new Basic management TLV Type carries a UUID of the server.

Figure 9:
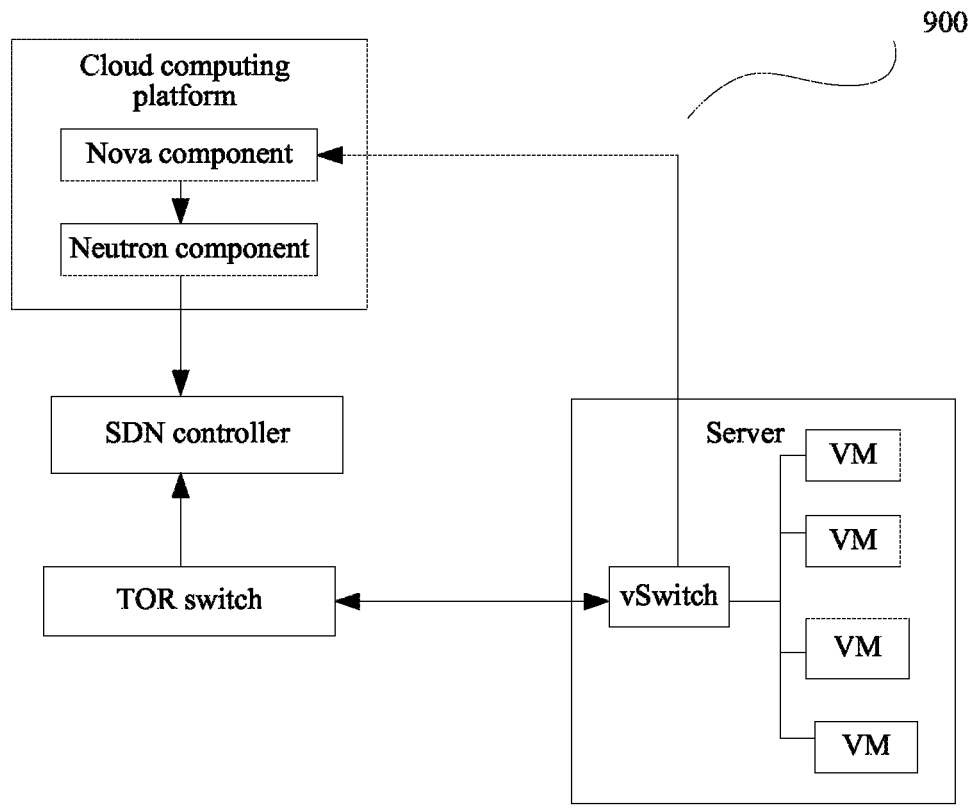
FIG. 9 is a schematic structural diagram of a SDN according to an embodiment of the application.

As shown in FIG. 9, an embodiment of the application further provides a software-defined network SDN 900, including: the SDN controller, the top-of-rack TOR switch, the cloud computing platform, and the server that are described above.

Figure 10:
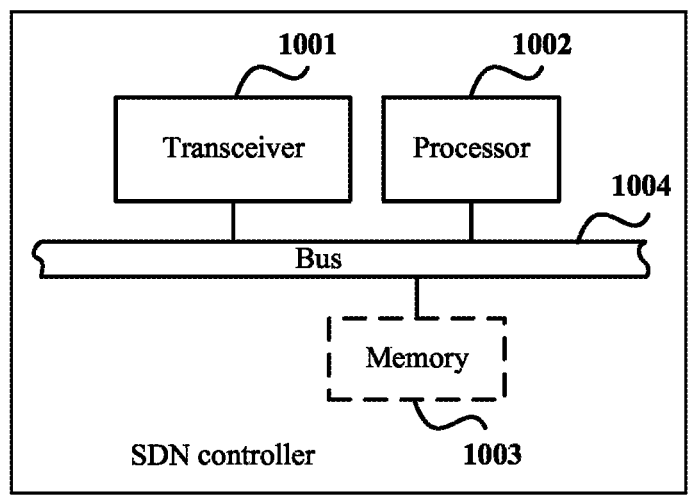
FIG. 10 is a schematic structural diagram of a SDN controller according to an embodiment of the application.

Referring to FIG. 10, an embodiment of the application further provides an SDN controller, including: a transceiver 1001, a processor 1002, a memory 1003, and a bus 1004, where the transceiver 1001, the processor 1002, and the memory 1003 are connected to each other and communicate with each other by using the bus 1004.

The bus 1004 may be an Industry Standard Architecture (ISA) bus, a peripheral component interconnect (PCI) bus or an Extended Industry Standard Architecture (EISA) bus, or the like. The bus 1004 may be classified into an address bus, a data bus, a control bus, and the like. For ease of representation, only one line is used for representation in the figure, but it does not indicate that there is only one bus or one type of bus.

The memory 1003 is configured to store program code, where the program code includes an operation instruction. The memory 1003 may include a high-speed random access memory (RAM), or may include a non-volatile memory, such as magnetic disk memory.

The processor 1002 may be a central processing unit (CPU) or an application-specific integrated circuit (ASIC), or is configured as one or more integrated circuits that implement the embodiments of the application.

The transceiver 1001 is configured to receive virtual network information sent by a cloud computing platform, where the virtual network information includes a correspondence between information about a VM and information about a server running the VM.

The processor 1002 is configured to invoke the program code that is in the memory 1003, to perform the following operations: acquiring physical network information, where the physical network information includes a correspondence between information about a top-of-rack TOR switch connected to the server and the information about the server; and acquiring a correspondence between the information about the VM and the information about the TOR switch according to the virtual network information and the physical network information.

Figure 11:
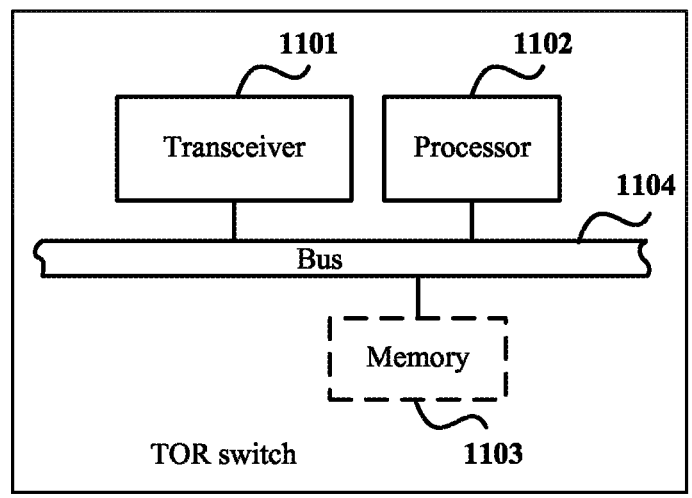
FIG. 11 is a schematic structural diagram of a TOR switch according to an embodiment of the application.

As shown in FIG. 11, an embodiment of the application further provides a TOR switch, including: a transceiver 1101, a processor 1102, a memory 1103, and a bus 1104, where the transceiver 1101, the processor 1102, and the memory 1103 are connected to each other and communicate with each other by using the bus 1104.

The bus 1104 may be an Industry Standard Architecture (ISA) bus, a peripheral component interconnect (PCI) bus or an Extended Industry Standard Architecture (EISA) bus, or the like. The bus 1104 may be classified into an address bus, a data bus, a control bus, and the like. For ease of representation, only one line is used for representation in the figure, but it does not indicate that there is only one bus or one type of bus.

The memory 1103 is configured to store program code, where the program code includes an operation instruction. The memory 1103 may include a high-speed random access memory (RAM), or may include a non-volatile memory, such as magnetic disk memory.

The processor 1102 may be a central processing unit (CPU) or an application-specific integrated circuit (ASIC), or is configured as one or more integrated circuits that implement the embodiments of the application.

The transceiver 1101 is configured to receive a LLDP packet sent by a server, where the LLDP packet carries information about the server.

The processor 1102 is configured to invoke the program code that is in the memory 1103, to perform the following operations: encapsulating the LLDP packet as an OpenFlow protocol standard Packet-In message through adding information about the TOR switch to the LLDP packet that carries information about the server, and sending the Packet-In message to an SDN controller; or parsing the received LLDP packet sent by the server to obtain the information about the server, and sending physical network information to the SDN controller, where the physical network information includes a correspondence between information about the TOR switch and the information about the server.

Figure 12:
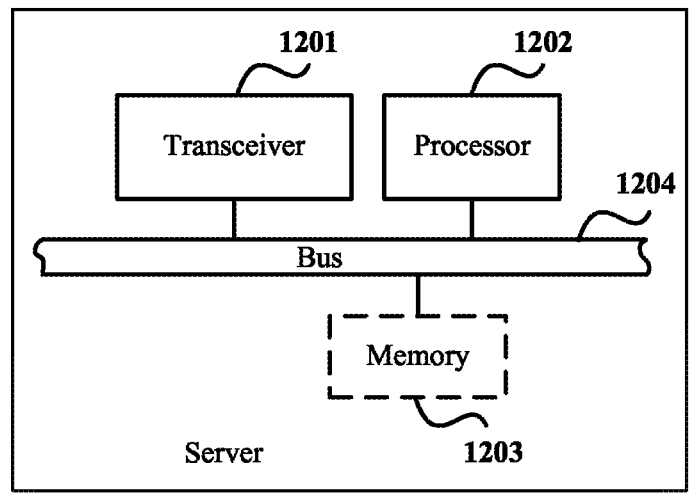
FIG. 12 is a schematic structural diagram of a server according to an embodiment of the application.

As shown in FIG. 12, an embodiment of the application further provides a server, including: a transceiver 1201, a processor 1202, a memory 1203, and a bus 1204, where the transceiver 1201, the processor 1202, and the memory 1203 are connected to each other and communicate with each other by using the bus 1204.

The bus 1204 may be an Industry Standard Architecture (ISA) bus, a peripheral component interconnect (PCI) bus or an Extended Industry Standard Architecture (EISA) bus, or the like. The bus 1204 may be classified into an address bus, a data bus, a control bus, and the like. For ease of representation, only one line is used for representation in the figure, but it does not indicate that there is only one bus or one type of bus.

The memory 1203 is configured to store program code, where the program code includes an operation instruction. The memory 1203 may include a high-speed random access memory (RAM), or may include a non-volatile memory (non-volatile memory), such as magnetic disk memory.

The processor 1202 may be a central processing unit (CPU) or an application-specific integrated circuit (ASIC), or is configured as one or more integrated circuits that implement the embodiments of the application.

The transceiver 1201 is configured to send virtual network information to a cloud computing platform, where the virtual network information includes a correspondence between information about a virtual machine VM running on the server and information about the server.

The processor 1202 is configured to invoke the program code that is in the memory 1203, to perform the following operations: sending an LLDP packet to a TOR switch, where the LLDP packet carries the information about the server.

Because functional implementation of the apparatus according to this embodiment of the application and that of the method both belong to a same inventive concept, reference may be made to the method, and details are not described herein.

According to a method, an apparatus, and a system for implementing an SDN provided in the embodiments of the application, a physical forwarding path may be established on a physical network for a virtual machine, so as to implement mapping from a virtual network to the physical network, and better support, on a cloud computing platform, self-service provisioning and on-demand adjustment of an SDN controller. In addition, this solution of the application is easy to implement. Moreover, protocol load is small when an LLDP is run on a server. Therefore, server performance is barely affected.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the application.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions of the embodiments.

In addition, functional modules in the embodiments of the application may be integrated into one processing module, or each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of the application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the application, but are not intended to limit the protection scope of the application. Any variation or replacement readily figured out by a person skilled in the art within the technical scope disclosed in the application shall fall within the protection scope of the application. Therefore, the protection scope of the application shall be subject to the protection scope of the claims.

What is claimed is:

1. A method, comprising:
receiving, by a software-defined network (SDN) controller, virtual network information sent by a cloud computing platform, wherein the virtual network information comprises a correspondence between information about a virtual machine (VM) and information about a server running the VM, wherein the information about the VM comprises a VM address;
receiving, by the SDN controller, physical network information, wherein the physical network information comprises a correspondence between information about a top-of-rack (TOR) switch coupled with the server and the information about the server, wherein the information about the TOR switch comprises an identity associated with the TOR switch; and
determining, by the SDN controller, a correspondence between the VM address and the identity associated with the TOR switch, according to the virtual network information and the physical network information.

2. The method according to claim 1, wherein:
the VM address comprises a VM media access control (MAC) address or a VM internet protocol (IP) address;
the information about the server comprises information selected from the group consisting of: a network interface card address of the server, a system name of the server, a universally unique identifier (UUID) of the server, and an identifier of a virtual switch on the server; and
the identity associated with the TOR switch comprises an equipment identity of the TOR switch and information about a physical port connected to the server.

3. The method according to claim 2, wherein the network interface card address of the server is carried by a Link Layer Discovery Protocol (LLDP) packet of Basic management type-length-value (TLV) Type 2, the system name of the server is carried by using an LLDP packet of Basic management TLV Type 5, or the UUID of the server is carried by adding an LLDP packet of a new Basic management TLV Type.

4. The method according to claim 1, wherein receiving, by the SDN controller, the physical network information comprises:
receiving, by the SDN controller, an OpenFlow protocol standard Packet-In message sent by the TOR switch; and
parsing, by the SDN controller, the Packet-In message to obtain the physical network information.

5. The method according to claim 4, wherein the Packet-In message is formed by encapsulating, by the TOR switch, a received LLDP packet with the identity associated with the TOR switch, wherein the received LLDP packet is sent by the server, and the received LLDP packet comprises the information about the server.

6. The method according to claim 1, wherein receiving, by the SDN controller, the physical network information comprises:
receiving, by the SDN controller, the physical network information sent by the TOR switch, wherein the TOR switch has parsed a received LLDP packet sent by the server to obtain the information about the server.

7. The method according to claim 1, wherein receiving the virtual network information comprises:
receiving, by the SDN controller, a virtual network configuration table sent by the cloud computing platform, wherein the virtual network configuration table carries the virtual network information, and wherein a tunnel_endpoints table in the virtual network configuration table carries the information about the server.

8. A software-defined network (SDN) controller, comprising:
a processor; and
a non-transitory computer readable storage medium storing a program for execution by the processor, the program including instructions to:
receive virtual network information sent by a cloud computing platform, wherein the virtual network information comprises a correspondence between information about a virtual machine (VM) and information about a server running the VM, wherein the information about the VM comprises a VM address;
receive physical network information, wherein the physical network information comprises a correspondence between information about a top-of-rack (TOR) switch coupled with the server and the information about the server, wherein the information about the TOR switch comprises an identity associated with the TOR switch; and
determine a correspondence between the VM address and the identity associated with the TOR switch according to the virtual network information and the physical network information.

9. The SDN controller according to claim 8, wherein the VM address comprises a VM media access control (MAC) address or a VM internet protocol (IP) address;
wherein the information about the server comprises information selected from the group consisting of: a network interface card address of the server, a system name of the server, a universally unique identifier (UUID) of the server, and an identifier of a virtual switch on the server; and
wherein the identity associated with the TOR switch comprises an equipment identity of the TOR switch and information about a physical port connected to the server.

10. The SDN controller according to claim 8, wherein the instructions to receive the physical network information comprise instructions to:
receive an OpenFlow protocol standard Packet-In message sent by the TOR switch; and
parse the Packet-In message to obtain the physical network information.

11. A top-of-rack (TOR) switch, comprising:
a processor; and
a non-transitory computer readable storage medium storing a program for execution by the processor, the program including instructions to:
receive a Link Layer Discovery Protocol (LLDP) packet sent by a server, wherein the LLDP packet carries information about the server;
encapsulate the LLDP packet as an OpenFlow protocol standard Packet-In message by adding information about the TOR switch to the LLDP packet that carries the information about the server, wherein the information about the TOR switch comprises an identity associated with the TOR switch; and
send the Packet-In message to a software-defined network (SDN) controller.

12. The TOR switch of claim 11, wherein the instructions further comprise instructions to:
parse the LLDP packet to obtain the information about the server; and
send physical network information to the SDN controller, wherein the physical network information comprises a correspondence between the identity associated with the TOR switch and the information about the server.

13. The TOR switch according to claim 11, wherein:
the LLDP packet is an LLDP packet of Basic management type-length-value (TLV) Type 2, an LLDP packet of Basic management TLV Type 5, or an LLDP packet of a new Basic management TLV Type; and
the LLDP packet of Basic management TLV Type 2 carries a network interface card media access control (MAC) address of the server, the LLDP packet of Basic management TLV Type 5 carries a system name of the server, and the LLDP packet of the new Basic management TLV Type carries a universally unique identifier (UUID) of the server.

14. A cloud computing platform, comprising:
a processor;
a non-transitory computer readable storage medium storing a program for execution by the processor, the program including instructions to:
receive virtual network information sent by a server running a virtual machine (VM), wherein the virtual network information comprises a correspondence between information about the VM and information about the server, wherein the information about the VM comprises a VM address; and
send the virtual network information to a software-defined network (SDN) controller.

15. The cloud computing platform according to claim 14, wherein the instructions further comprise instructions to send a virtual network configuration table to the SDN controller, the virtual network configuration table carries the virtual network information, and a tunnel_endpoints table in the virtual network configuration table carries the information about the server.

16. A server, comprising:
a processor; and
a non-transitory computer readable storage medium storing a program for execution by the processor, the program including instructions to:
  send virtual network information to a cloud computing platform, wherein the virtual network information comprises a correspondence between information about a virtual machine (VM) running on the server and information about the server, wherein the information about the VM comprises a VM address; and
  send a Link Layer Discovery Protocol (LLDP) packet to a top-of-rack (TOR) switch, wherein the LLDP packet carries the information about the server.

17. The server according to claim 16, wherein:
the LLDP packet is an LLDP packet of Basic management type-length-value (TLV) Type 2, an LLDP packet of Basic management TLV Type 5, or an LLDP packet of a new Basic management TLV Type; and
the LLDP packet of Basic management TLV Type 2 carries a network interface card media access control (MAC) address of the server, the LLDP packet of Basic management TLV Type 5 carries a system name of the server, and the LLDP packet of the new Basic management TLV Type carries a universally unique identifier (UUID) of the server.

18. A system, comprising:
a server;
a cloud computing platform;
a top of rack (TOR) switch; and
a software-defined network (SDN) controller;
wherein the server is configured to:
  send virtual network information to the cloud computing platform, wherein the virtual network information comprises a correspondence between information about a virtual machine (VM) running on the server and information about the server, and wherein the information about the VM comprises a VM address; and
  send a Link Layer Discovery Protocol (LLDP) packet to the TOR switch, wherein the LLDP packet carries the information about the server;
wherein the cloud computing platform is configured to:
  receive the virtual network information; and
  send the virtual network information to a software-defined network (SDN) controller;
wherein the TOR switch is configured to:
  receive the LLDP packet sent by the server;
  encapsulate the LLDP packet as an OpenFlow protocol standard Packet-In message by adding information about the TOR switch to the LLDP packet that carries the information about the server, wherein the information about the TOR switch comprises an identity associated with the TOR switch; and
  send the Packet-In message to the SDN controller; and
wherein the SDN controller is configured to:
  receive the virtual network information;
  receive physical network information, wherein the physical network information comprises a correspondence between the identity associated with the TOR switch and the information about the server; and
  determine a correspondence between the VM address and the identity associated with the TOR switch according to the virtual network information and the physical network information.

* * * * *